US008173720B2

(12) United States Patent  
Nakada et al.

(10) Patent No.: US 8,173,720 B2  
(45) Date of Patent: May 8, 2012

(54) TRANSPARENT GEL AND CONTACT LENSE FROM THE SAME

(75) Inventors: Kazuhiko Nakada, Kasugai (JP); Takahito Nakase, Kasugai (JP); Takahiro Adachi, Ibaraki (JP); Akira Yamamoto, Gunma (JP); Masahiko Minemura, Gunma (JP)

(73) Assignees: Mitsubishi Gas Chemical Company, Inc., Tokyo (JP); Menicon Co., Ltd., Aichi (JP)

( * ) Notice: Subject to any disclaimer, the term of this patent is extended or adjusted under 35 U.S.C. 154(b) by 650 days.

(21) Appl. No.: 11/813,781

(22) PCT Filed: Jan. 13, 2006

(86) PCT No.: PCT/JP2006/300364  
§ 371 (c)(1),  
(2), (4) Date: Jul. 12, 2007

(87) PCT Pub. No.: WO2006/077778  
PCT Pub. Date: Jul. 27, 2006

(65) Prior Publication Data  
US 2009/0012205 A1    Jan. 8, 2009

(30) Foreign Application Priority Data  
Jan. 20, 2005 (JP) ................................. 2005-013082

(51) Int. Cl.  
 *G02C 7/04*    (2006.01)

(52) U.S. Cl. ........ 523/106; 523/107; 523/108; 525/100; 525/103; 525/464; 525/468; 528/29; 528/219; 528/370

(58) Field of Classification Search .................... 525/101  
See application file for complete search history.

(56) References Cited

U.S. PATENT DOCUMENTS

| 3,959,102 | A | * | 5/1976 | Wajs et al. .................... 522/129 |
| 4,430,458 | A | | 2/1984 | Tighe et al. |
| 5,789,483 | A | | 8/1998 | Ingenito et al. |
| 6,340,737 | B2 | * | 1/2002 | Ogawa et al. ................. 528/196 |
| 6,638,991 | B2 | * | 10/2003 | Baba et al. ..................... 522/99 |
| 2003/0125498 | A1 | * | 7/2003 | McCabe et al. ................ 528/25 |
| 2004/0258727 | A1 | * | 12/2004 | Liu et al. ....................... 424/423 |

FOREIGN PATENT DOCUMENTS

| JP | 49-056643 | | 6/1974 |
| JP | 2-297426 | | 12/1990 |
| JP | 5-313104 | | 11/1993 |
| JP | 06-503103 | | 4/1994 |
| JP | 8-501504 | | 2/1996 |
| JP | 9-500920 | | 1/1997 |
| JP | 2001-131279 | | 5/2001 |
| JP | 2001-342247 | | 12/2001 |
| JP | 2002-284871 | | 10/2002 |
| JP | 2004-075948 | | 3/2004 |
| JP | 2004-535598 | | 11/2004 |
| JP | 2005-206699 | | 8/2005 |
| JP | 2005206699 A | * | 8/2005 |
| WO | WO 92/07013 | | 4/1992 |

OTHER PUBLICATIONS

"Low-Density, Mutually Interpenetrating Organic-Inorganic Composite Materials via Supercritical Drying Techniques" authored by Novak et al. and published in Chemistry of Materials (1994) 6, 282-286.*  
"A Two-Step Method for the Synthesis of a Hydrophilic PDMS Interpenetrating Polymer Network" authored by Hillerstrom et al. and published in the Journal of Applied Polymer Science (2008) 110, 3059-3067.*  
Supplementary European Search Report; Application No. EP 06 71 1649; Date of Completion: Apr. 3, 2008.  
International Search Report; International application No. PCT/JP2006/300364; Date of mailing: Apr. 18, 2006.  
Notification of Transmittal of Translation of the International Preliminary Report on Patentability; Form PCT/IB/338 mailed Aug. 2, 2007 in international application No. PCT/JP2006/300364.  
International Preliminary Report on Patentability; Form PCT/IB/373 issued Jul. 24, 2007 in international application No. PCT/JP2006/300364.  
Japanese Office Action dated Jul. 13, 2010; Japanese Patent Application No. 2005-013082.

* cited by examiner

*Primary Examiner* — Marc Zimmer  
(74) *Attorney, Agent, or Firm* — Antonelli, Terry, Stout & Kraus, LLP.

(57) ABSTRACT

A transparent gel is disclosed which has an interpenetrating polymer network of a copolymer containing a polysiloxane structure and a polycarbonate structure and a hydrophilic polymer obtained by polymerizing a hydrophilic monomer. The transparent gel is useful as a cultivation substrate, a container for storage and an ophthalmic material, comprising an easily synthesizable and purifiable silicon-containing resin, wherein a gel strength, transparency, oxygen permeability, birefringence and other characteristics are excellent.

10 Claims, 1 Drawing Sheet

TRANSPARENT GEL AND CONTACT LENSE FROM THE SAME

RELATED APPLICATION

This application is a U.S. national phase application under 35 U.S.C. §371 of International Application No. PCT/JP2006/300364 filed Jan. 13, 2006, which claims priority of Japanese Patent Application No. 2005-013082 filed Jan. 20, 2005.

TECHNICAL FIELD

The present invention relates to a transparent gel, which has an interpenetrating polymer network of a copolymer containing a polysiloxane structure and a polycarbonate structure and a hydrophilic polymer obtained by polymerizing a hydrophilic monomer, particularly relates to a cultivation substrate such as a cell and a organ, a container useful for storage and an ophthalmic material (e.g. a contact lens (hereinafter referred to as "CL")).

BACKGROUND ART

Hereinbefore, a macromonomer wherein polymerizable groups are introduced into the both terminal positions of polydimethyl siloxane has been used as a material of CL. However, the macromonomer is difficult to be synthesized and there have been problems in control of its molecular weight and introduction rate of the polymerizable groups, and further, there has been a restriction in obtaining suitable properties for functioning as a cross-linking agent. Still further, its polymerizability is not certain because it is high molecular weight, and thus it has been pointed out such a problem that stable polymerization is sometimes not attainable.

A polycarbonate resin has been used as an alternative material in various usages because of its transparency. There are disclosed that a polycarbonate resin obtained by reacting (1) bis (4-hydroxyphenyl)fluorene, (2) a polysiloxane, and upon necessity (3) a bisphenol with a compound forming a carbonic acid ester in Japanese Patent Publication No. 2002-284871A, a polycarbonate resin obtained by reacting the compound (1) and the compound (2) with a compound forming a carbonic acid ester in Japanese Patent Publication No. 2001-131279A and a polycarbonate resin obtained by reacting the compound (1), the compound (2) and the compound (3) with a compound forming a carbonic acid ester in Japanese Patent Publication No. 2001-342247A show, respectively, moldability, transparency and double refraction suitable to an optical material. The polycarbonates disclosed herein have advantages such as easy synthesis and purification and in molecular weight control. But, there is no specific disclosure of using the resin particularly as CL, and no study has been made on oxygen permeability and other characteristics necessary to use it as CL nor on moldability capable of giving CL or a molded article analogous to a form of CL. Further, those materials themselves are rigid and thus are not suitable to a cultivation substrate and an ophthalmic material.

On the other hand, a method of polymerizing a hydrophilic monomer under addition of a polymer, particularly polyacrylate for improving a gel strength has been known. But, there is such a problem that when polymerization is conducted under addition of a polydimethyl siloxane or polycarbonate as a polymer, there causes sticky property originated from a silicone in a case of polydimethyl siloxane and no gas permeability desired is obtained, though the strength is increased in a case of polycarbonate. Further, when its amount to be added is increased, transparency cannot be kept and thus it is not suitable as a lens material.

DISCLOSURE OF INVENTION

The present invention has an object to provide a transparent gel useful as a cultivation substrate, a container for storage and an ophthalmic material, comprising an easily synthesizable and purifiable silicone-containing resin, wherein a gel strength, transparency, oxygen permeability, refractive index and other characteristics are excellent.

Extensive study has been conducted in order to solve the above problem to reach finding that a transparent gel having an interpenetrating polymer network between the copolymer as mentioned below and the hydrophilic polymer as mentioned below, comprising a specific carbonate resin (a copolymer) containing a polysiloxane structure and a hydrophilic polymer obtained by polymerizing a hydrophilic monomer is excellent in a gel strength, transparency, oxygen permeability, refractive index and other characteristics, and the present invention has been completed on the basis of this finding.

Namely, the present invention relates to a transparent gel having an interpenetrating polymer network between the copolymer as mentioned below and the hydrophilic polymer as mentioned below, comprising a copolymer containing a polysiloxane structure and a polycarbonate structure and a hydrophilic polymer obtained by polymerizing a hydrophilic monomer.

It is preferable that the above copolymer containing a polysiloxane structure and a polycarbonate structure is derived from a compound shown by the general formula (A) and a compound shown by the general formula (B) and a compound forming a carbonic acid ester.

(wherein $R^1$ and $R^2$ are, respectively and independently, a member selected from the group consisting of a hydrogen atom, an alkyl group of C1-C10, an aryl group of C6-C12, an alkenyl group of C2 to C5, an alkoxy group of C1 to C5 and an aralkyl group of C7-C17, and when those groups have a carbon atom, those groups may contain a substituent selected from the group consisting of an alkyl group of C1 to C5, an alkenyl group of C2 to C5 and an alkoxy group of C1 to C5, Y is a group shown by the formula:

(wherein R³ to R⁶ are respectively a member selected from the group consisting of a hydrogen atom, an alkyl group of C1 to C10, an alkenyl group of C2 to C10, an alkoxy group of C1 to C10 and an aryl group of C6 to C12, or both R3 and R4 and both R5 and R6 are respectively combined together to form a carbon ring or a heterocyclic ring, and when those groups contain a carbon atom, those groups may have a substituent selected from the group consisting of an alkyl group of C1 to C5, an alkenyl group of C2 to C5 and an alkoxy group of C1 to C5, and a is an integer of 0 to 20), or a formula:

(B)

(wherein R⁷ to R¹⁴ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5. R¹⁵ is a aliphatic group of C1 to C6 or only shows a bond. X is a single polymer or a random copolymer of —SiO(R¹⁶)(R¹⁷)— and/or —SiO(R¹⁸)(R¹⁹)— and its polymerization degree is 0 to 200, and R¹⁶ to R¹⁹ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5).

The above hydrophilic monomer is preferably a monomer containing a nitrogen atom, and more preferably N-vinyl pyrrolidone, N,N-dimethylacrylamide and/or N-methyl-3-methylidene pyrrolidone.

The compound shown by the above formula (A) is preferably a member selected from the group consisting of 9,9-bis(4-hydroxyphenyl)fluorene, 9,9-bis(4-hydroxy-3-methylphenyl) fluorene and 9,9-bis(4-hydroxy-2-methylphenyl) fluorene.

It is preferable that a ratio of the polysiloxane structure to the polycarbonate structure contained in the above copolymer is 25:75 to 75:25 by weight and a ratio of the above copolymer to the above hydrophilic monomer is 5:95 to 40:60 by weight.

The present invention also relates to a method for producing a transparent gel, comprising a process of dissolving a copolymer containing a polysiloxane structure and a polycarbonate structure in a hydrophilic monomer solution, followed by polymerization.

Upon dissolving the above copolymer in the hydrophilic monomer solution, it is preferable to include a process of adding further a cross linking agent, particularly allyl methacrylate or diethyleneglycol diallyl ether.

The above polymerization is preferably conducted in a mold.

The present invention still further relates to a contact lens comprising the above transparent gel.

BEST MODE FOR CARRYING OUT THE INVENTION

The transparent gel of the present invention comprises a copolymer containing a polysiloxane structure and a polycarbonate structure and a hydrophilic polymer obtained by polymerizing a hydrophilic monomer, and the gel contains an interpenetrating polymer network (IPN) between the said copolymer and the hydrophilic polymer.

The transparency in the present invention means 80% or more visual ray transmittance rate (% T).

The copolymer used in the present invention is derived from a compound containing a polysiloxane structure and other compound forming a polycarbonate structure (hereinafter referred to as a polycarbonate-forming compound).

The polycarbonate-forming compound is not specifically restricted and exemplified by a compound shown by the following general formula (A) (hereinafter referred to as a compound (A))

(A)

(wherein R¹ and R² are, respectively and independently, a member selected from the group consisting of a hydrogen atom, an alkyl group of C1-C10, an aryl group of C6-C12, an alkenyl group of C2 to C5, an alkoxy group of C1 to C5 and an aralkyl group of C7-C17, and when those groups have a carbon atom, those groups may contain a substituent selected from the group consisting of an alkyl group of C1 to C5, an alkenyl group of C2 to C5 and an alkoxy group of C1 to C5, Y is a group shown by the formula:

(wherein R³ to R⁶ are respectively a member selected from the group consisting of a hydrogen atom, an alkyl group of C1 to C10, an alkenyl group of C2 to C10, an alkoxy group of C1 to C10 and an aryl group of C6 to C12, or both R³ and R⁴ and both R⁵ and R⁶ are respectively combined together to form a carbon ring or a heterocyclic ring, and when those group contain a carbon atom, those group may have a substituent selected from the group consisting of an alkyl group of C1 to C5, an alkenyl group of C2 to C5 and an alkoxy group of C1 to C5, and a is an integer of 0 to 20), The compound (A) is specifically exemplified by 9,9-bis (4-hydroxy-2-methylphenyl)fluorene, 9,9-bis(4-hydroxy-3-methylphenyl)fluorene, 9,9-bis(4-hydroxyphenyl)fluorene, 3,6-dimethyl-9,9-bis(4-hydroxyphenyl)fluorene, 9,9-bis(3-methoxy-4-hydroxyphenyl)fluorene, 9,9-bis (3-ethoxy-4-hydroxyphenyl)fluorene, 9,9-bis(3-ethyl-4-hydroxyphenyl) fluorene, 4,5-dimethyl-9,9-bis(4-hydroxyphenyl)fluorene, 9,9-bis(3-phenyl-4-hydroxyphenyl)fluorene, 3,6-dimethyl-9,9-bis(3-methyl-4-hydroxyphenyl)fluorene, and 3,6-diphenyl-9,9-bis(4-hydroxyphenyl)fluorene, 4,4'-biphenyldiol, bis (4-hydroxyphenyl)methane, bis(4-hydroxyphenyl)ether, bis (4-hydroxyphenyl)sulfone, bis(4-hydroxy-3-methylphenyl) sulfone, bis(4-hydroxyphenyl)sulfoxide, bis(4-hydroxyphenyl)sulfide, bis (4-hydroxyphenyl)ketone, 1,1-bis(4-hydroxyphenyl)ethane, 2,2-bis (4-hydroxyphenyl)propane (bisphenol A;BPA), 2,2-bis (4-hydroxyphenyl)butane, 1,1-bis(4-hydroxyphenyl)cyclohexane (bisphenolZ;BPZ), 2,2-bis(4-hydroxy-3-methylphenyl)propane (dimethylbisphenol A), 2,2-bis(4-hydroxy-3,5-dimethylphenyl)propane, 1,1-bis (4-hydroxyphenyl)-1-phenylethane (bisphenol AP;BPAP), bis(4-hydroxyphenyl)diphenylmethane, 2,2-bis(4-hydroxy-3-allylphenyl)propane, 3,3,5-trimethyl-1,1-bis(4-hydroxyphenyl)cyclohexane, etc. Among them, a compound in the general formula (A) wherein $R^1$ and $R^2$ are $CH_3$ and Y is fluorene structure is preferable in view of its oxygen permeability, particularly, 9,9-bis(4-hydroxyphenyl)fluorene, 9,9-bis(4-hydroxy-3-methylphenyl)fluorene, 9,9-bis(4-hydroxy-2-methylphenyl)fluorene are preferable in view of their good reactivity and producibility in an industrial scale and easy availability. They can be used in combination of two or more thereof.

The compound forming a polysiloxane structure is not specifically restricted and is exemplified by a compound shown by the following general formula (B) (hereinafter referred to as a compound (B)

(B)

(wherein $R^7$ to $R^{14}$ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5. $R^{15}$ is a aliphatic group of C1 to C6 or only shows a bond. X is a single polymer or a random copolymer of —SiO($R^{16}$)($R^{17}$)— and/or —SiO($R^{18}$)($R^{19}$)— and its polymerization degree is 0 to 200, and $R^{16}$ to $R^{19}$ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a sub-stituent selected from the group consisting of an alkyl group of C1 to C5, an alkenyl group of C2 to C5 and an alkoxy group of C1 to C5).

The polymerization degree in the X part is 0-200, preferably 10-150. When the polymerization degree is more than 200, transparency and strength are tend to be decreased.

$R^{11}$ to $R^{14}$ in the general formula (B) are preferably a methyl group and a phenyl group from a view point of keeping oxygen permeability and refractive index rate.

The compound (B) is specifically exemplified by those shown by the following structures.

X is $a \geqq 0$, $b \geqq 0$, $c \geqq 0$ $200 \geqq (a+b+c) \geqq 0$

Those wherein plural of the blocks in the below are bound randomly.

They can be used in combination of two or more. X is particularly preferably a single polymer or a random copolymer containing 1-100 dimethylsiloxane and/or diphenylsiloxane. Among them, a random copolymer of diphenyl siloxane and dimethyl siloxane containing 3-(o-hydroxyphenyl) propyl groups at α,ω-positions, α,ω-bis[3-(o-hydroxyphenyl) propyl]polydimethyl siloxane is preferable from viewpoints of oxygen permeability, refraction ratio and transparency.

A ratio of the polysiloxane structure and the polycarbonate structure is 25:75 to 75:25 by weight, preferably 40:60 to 70:30 by weight. When the polysiloxane structure is less than 25 wt % and the polycarbonate is more than 75 wt %, rigidity tends to be excessive for using it as a soft contact lens, and also the desired oxygen permeability tends to be unobtainable for using it as a material for a contact lens. When the polysiloxane structure is more than 75 wt % and the polycarbonate is less than 25 wt %, strength tends to be decreased.

The copolymer containing the polysiloxane structure and the polycarbonate structure is derived, for example, from the compound (A), the compound (B) and a compound forming a carbonic acid ester.

The compound forming a carbonic acid ester is exemplified by phosgene, bis-aryl carbonate such as diphenylcarbonate, di-p-tricarbonate, phenyl-p-tricarbonate, di-p-chlorophenyl carbonate and dinaphthyl carbonate, and the like. Those compounds can be used in combination of two or more. Among them, phosgene and diphenyl carbonate are particularly preferable from viewpoints of good reactivity and producible at a low cost.

An amount of the compound forming a carbonic acid ester to be used is 1.0-2.0 mole, preferably 1.2-1.5 mole per mole of the total bisphenols. When the amount is less than 1.0 mole, the molecular weight cannot be increased up to the desired molecular weight and thus no polymer is obtained, and when it is more than 2.0 mole, the compound forming a carbonic acid ester which is not used in polymerization remains in the polymer, badly influencing the quality of the polymer.

As a method for producing the copolymer by reacting the above compound (A), compound (B) and compound forming a carbonic acid ester, a conventional method for producing a polycarbonate derived from a bisphenol A can be adopted. For instance, a direct reaction of a bisphenol compound and phosgene (a phosgene method), or an ester exchange reaction (an ester exchange method) of a bisphenol compound and a bisaryl carbonate, etc. can be adopted. Comparing the phosgene method with the ester exchange method, the former is preferable from a viewpoint of the reactivity between the compound (A) and the compound (B).

In the phosgene method, generally, the compound (A) and the compound (B) are reacted with phosgene in the presence of an acid binding agent and a solvent. As the acid binding agent, use is made of, for example, pyridine and an alkaline metal hydroxide such as sodium hydroxide and potassium hydroxide. As the solvent, use is made of dichloromethane, chloroform, chlorobenzene, xylene, etc. Further, in order to accelerate condensation polymerization reaction, a tertiary amine catalyst such as triethylamine is used, and in order to control polymerization degree, a monofunctional compound such as phenol, p-tert-butylphenol, p-cumylphenol, an alkyl substituted phenol, alkyl hydroxy benzoate and alkyl oxyphenol, etc. can be added as a molecular weight controlling agent. Further, if necessary, an anti-oxidant such as sodium sulfite and hydrosulfite, and a branching agent such as fluoroglycine, isatin bisphenol, 1,1,1-tris (4-hydroxyphenyl)ethane, α,α′, α″-tris (4-hydroxyphenyl)-1,3,5-triisopropyl benzene, etc. may be added in an small amount. The reaction temperature is generally 0-150° C. preferably 5-40° C. The reaction time depends upon the reaction temperature, and generally 0.5 minutes to 10 hours, preferably 1 minute to 2 hours. Further, pH in the reaction system is desirably kept at 10 or more during the reaction.

On the other hand, in the ester exchange method, the compound (A) and the compound (B) are mixed with a bisaryl carbonate and reacted with each other under reduced pressure at a high temperature. In this stage, a monofunctional compound such as p-tert-butylphenol, p-cumyl phenol, an alkyl substituted phenol, an alkyl hydroxybenzoate and an alkyloxy phenol may be added as a molecular weight controlling agent. Further, upon necessity, an anti-oxidant and a branching agent may be added. The reaction is conducted generally at 150-350° C., preferably 200-300° C., and phenols originated from the said bisaryl carbonates are removed out of the reaction system by reducing the pressure preferably finally down to 1 mmHg or lower. The reaction time depends upon the reaction temperature and degree of reduced pressure, and generally is 1 to 10 hours. The reaction is preferably conducted under atmosphere of an inert gas such as nitrogen and argon.

In a case of adopting the phosgene method in the present invention, it is possible to blow phosgene in the presence of a quaternary ammonium salt in order to conduct the reaction effectively. The quaternary ammonium salt is specifically exemplified by tetramethyl ammonium chloride, trimethylbenzyl ammonium chloride, triethylbenzyl ammonium chloride, tetraethyl ammonium bromide, tetra-n-butyl ammonium iodide, etc., among which trimethylbenzyl ammonium chloride and triethylbenzyl ammonium chloride are preferable. The quaternary ammonium salt is preferably used in an amount generally 0.0005-5 mole % relative to the total bisphenols used.

Further, in a case of using the molecular weight controlling agent, a monovalent phenol is particularly preferable, and specifically phenol, an alkyl substituted phenol such as butylphenol, octylphenol, nonylphenol, decanylphenol, tetradecanylphenol, heptadecanylphenol and octadecanylphenol; an alkyl hydroxybenzoate such as butyl hydroxylbenzoate, octyl hydroxy benzoate, nonyl hydroxy benzoate, decanyl hydroxy benzoate and heptadacanyl hydroxy benzoate; an alkyloxy phenol such as butoxy phenol, octyloxy phenol, nonyloxy phenol, decanyloxy phenol, tetradecanyloxy phenol, heptadecanyloxy phenol and octadecanyl phenol. etc. are exemplified. An amount of the molecular weight controlling agent to be used is 0.1-50 mole %, preferably 0.5-10 mole % relative to the total bisphenols.

The transparent gel of the present invention is obtained by polymerizing a mixture prepared by dissolving the above copolymer in a hydrophilic monomer solution.

The hydrophilic monomer used in the present invention is not specifically restricted and exemplified by a nitrogen atom-containing monomer such as N-vinyl pyrrolidone, N,N-dimethylacrylamide and N-methyl-3-methylidene pyrrolidone, metacrylic acid, hydroxyethyl (meth)acrylate, etc., among which the nitrogen atom-containing monomer, particularly N-vinyl pyrrolidone, N,N-dimethylacrylamide and N-methyl-3-methylidene pyrrolidone are preferable in view of prevention of white turbidity by suppressing phase-separation structure upon polymerization. Those hydrophilic monomers can be used in combination of two or more.

N-methyl-3-methylidene pyrrolidone is shown by the following structure.

In the present invention, a ratio of the copolymer to the hydrophilic monomer is 5:95 to 40:60 by weight, preferably 10:90 to 30:70 by weight. When the copolymer is less than 5 wt % and the hydrophilic monomer is more than 95 wt %, the effect of the present invention by the copolymer tends to be unobtainable. Further, mixing the copolymer with the hydrophilic monomer increases viscosity, and thus when the copolymer is more than 40 wt % and the hydrophilic monomer is less than 60 wt %, the resultant tends to be rigid though transparency and oxygen permeability are satisfactory.

In the present invention, the above copolymer has no polymerizable group, and thus shrinkage in its volume with polymerization can be suppressed. Therefore, good polymerization can be conducted even in a resin mold. Upon polymerization, a conventional polymerization initiator such as a heat polymerization initiator and a photo polymerization initiator is used.

A cross linking agent may be added to a mixture obtained by dissolving a copolymer in a hydrophilic monomer in order to provide a reinforcing effect. As the cross linking agent, a conventional one can be used, and allyl methacrylate and/or diethylene glycol diallyl ether are preferable because of an effect of increasing transparency of the obtained material. The cross linking agent is used in an amount of not more than 10 wt %, preferably not more than 5 wt %, relative to the total mixture.

In the mixture, there may be incorporated a silicone-containing monomer other than the compound (B) and a solvent. The solvent is exemplified by tetrahydrofuran, isopropanol, acetone, hexane, etc.

The limit viscosity of the transparent gel of the present invention is preferably within a range of 0.1-1.0 dL/g. Particularly, in a case where a high cycle molding is required, the preferable range is 0.13-0.6 dL/g, and more preferable range is 0.15-0.4 dL/g. When it is less than 0.1 dL/g, poor peelability and bowing tend to occur, and when it is more than 1.0 dL/g, flowability is poor and thus insufficient filling into a mold and generation of a flow mark tend to occur.

Upon producing the transparent gel of the present invention, high grade purification is preferred as in a conventional polycarbonate resin for an optical disk. More specifically, the product is purified in order to comply as possible with such standards that substantially no dust having a diameter of not less than 50 µm is found, an amount of dust having a diameter of 0.5-50 µm is not more than $3 \times 10^4$, an inorganic and organic residual chlorine content is not more than 2 ppm, a residual hydroxide group content is not more than 200 ppm, a residual nitrogen content is not more than 5 ppm, a residual monomer content is not more than 20 ppm, etc. Further, in order to remove a low molecular product and a solvent, an after treatment such as extraction can sometimes be conducted. Also regarding the compound (A), the compound (B) and the compound forming a carbonic acid ester, the starting materials, those materials wherein impurities and isomers are reduced as possible are preferably used.

Upon producing the transparent gel of the present invention, there may be incorporated, upon necessity for keeping stability and releasability, a hindered phenol type and a phosphite type antioxidant; a lubricating agent and a releasing agent such as a silicone, a fatty acid ester, a fatty acid, a fatty acid glyceride and a natural oil and fat such as bees wax; a benzotriazole type, a benzophenone type, a dibenzoyl methane type and a salicylate type photo stabilizer; an antistatic agent such as a polyalkylene glycol and a fatty acid glyceride.

Further it is possible to use a conventional bisphenol A type polycarbonate optionally in a range of not damaging the qualities of the transparent gel in order to reduce the cost and conduct recycling. In addition to the above characteristics as a molding material, it is specifically desirable for getting a clear visual power in CL that a double refraction of a 30° slant incident ray is not higher than 50 nm, preferably not higher than 25 nm, and a visual ray permeability of the transparent gel is at least not less than 80%, preferably not less than 90%. In order to provide a material which is safe for CL, oxygen permeability of the transparent gel is desirably not less than $50 \times 10^{-11}$ (cm$^2$/sec) (mLO$_2$/(mL·mmHg)), further $70 \times 10^{-11}$ (cm$^2$/sec)·(mLO$_2$/(mL·mmHg)) for continuous use.

In a case of producing CL from the transparent gel of the present invention, the transparent gel is molded in a lens blank having a button shape of 10-15 mm diameter and 2-5 mm thickness, and then the resultant is processed to a lens by a conventional cutting method and a photo processing such as laser. As the transparent gel of the present invention is excellent in moldability and low in double refraction, molding into a shape similar to a lens is also possible. In this process, a guard may be formed in a peripheral position for keeping processability. In any case, it is necessary to produce a molded article having such a shape that as possible molding distortion and a part accompanied with distortion is not put into use as CL.

Further, the material can be subjected to a plasma treatment or a glow discharge treatment under normal or reduced pressure in order to increase surface wettability. Still further, a graft polymerization may be conducted.

The transparent gel of the present invention is excellent in characteristics such as a gel strength, transparency, and oxygen permeability, and thus it can preferably be used as a cultivation substrate for cells and organs, a container for storage and an ophthalmic material (particularly material for CL).

EXAMPLE

Then, the invention is explained in more details referring to Examples, but the invention is not limited thereto by any means.

Copolymers (PCSi) containing a polysiloxane structure and a polycarbonate structure, which were used in Examples 1 to 8 were synthesized as following Table 1.

TABLE 1

|  | Ex. | | | | Com. Ex. |
| --- | --- | --- | --- | --- | --- |
|  | 1 to 5 | 6 | 7 | 8 | 1 |
| Polysiloxane structure: polycarbonate structure (weight ratio) | 50:50 | 50:50 | 40:60 | 40:60 | 50:50 |
| $R^1$ and $R^2$ at general formula (A) | $CH_3$ | $CH_3$ | $CH_3$ | $CH_3$ | $CH_3$ |
| Y at general formula (A) | fluorene | fluorene | fluorene | fluorene —$C(CH_3)_2$— | fluorene |
| Average degree of polymerization about X at general formula (B) | 17 | 40 | 17 | 40 | 17 |
| Composite system | Synthesis Ex. 1 | Synthesis Ex. 2 | Synthesis Ex. 3 | Synthesis Ex. 4 | Synthesis Ex. 1 |

Synthesis Example 1

In 30 L of 8.8% (w/v) sodium hydroxide were dissolved 3.904 kg of 9,9-bis(4-hydroxy-3-methylphenyl)fluorene (Osaka Gas Chemical Co., Ltd.: BCF) (hereinafter referred to as "BCFL"), 3.904 kg of polyorganosiloxane compound containing the following structure (Shin-Etsu Chemical Co., Ltd.: X-22-1875) (hereinafter referred to as "Si-1"), and 20 g of hydrogen sulfide.

27 L of dichloromethane was added to the resultant, and 1.790 kg of phosgene was blown into the resultant at 0.12 kg/min under agitation at 15° C.

Then, 119.8 g of p-tert-butylphenol (hereinafter referred to as "PTBP") and 10 L of 8.8% (w/v) sodium hydroxide were added to the resultant, followed by strongly agitating for 10 minutes, and furthermore 20 mL of triethylamine was added agitating for 1 hour to conduct polymerization.

X is

The polymers were separated into an aqueous phase and an organic phase, and the organic phase was neutralized by using phosphoric acid, and washed with water repeatedly until an electrical conductivity of washing was not over 10 μS/cm, whereby a purified resin solution was obtained. The purified resin solution obtained was dropped slowly into warm water at 60° C. undergoing strong agitation, and a solvent was removed, whereby the polymer was solidified. The solid was filtrated, and to give a white powdery polymer. Limit viscosity [η] of 0.5 g/dL solution containing this polymer in methylene chloride solvent was 0.24 dL/g at 20° C.

As the result of infrared spectrum, it was shown that the obtained polymer had an absorption in the vicinity of 1770 cm$^{-1}$ originated from a carbonyl group, an absorption in the vicinity of 1240 cm$^{-1}$ originated from an ether bond, whereby the polymer was confirmed as having a carbonate bond. And it was shown that the polymer barely had an absorption of 3650-3200 cm$^{-1}$ originated from a hydroxyl group. As the result of GPC analysis, either of monomers in this polymer was not over 20 ppm. Considering all the various factors together, this polymer was confirmed as a polycarbonate polymer having a following structure unit.

X is

Synthesis Example 2

A polymer was synthesized by the same manner as Synthesis Example 1, except for changing amounts of BCFL to 3.904 kg, of Phosgene to 1.610 kg, and of PTBP to 107.8 g, and using 3.904 kg of a polyorganosiloxane compound containing the following structure (Shin-Etsu Chemical Co., Ltd.: X-22-1821) (hereinafter referred to as "Si-2") instead of Si-1.

Limit viscosity [η] of the obtained polymer was 0.24 dL/g, and as the result of infrared spectrum and others, this polymer was confirmed as the same polycarbonate polymer structure as the polymer shown in Synthesis example 1 except for a polymerization ratio.

X is

Synthesis Example 3

A polymer was synthesized by the same manner as Synthesis Example 1, except for changing amounts of BCFL to 4.685 kg, of Si-1 to 3.123 kg, of Phosgene to 1.980 kg, and of PTBP to 135.0 g. Limit viscosity [η] of the obtained polymer was 0.25 dL/g, and as the result of infrared spectrum and others, this polymer was confirmed as the same polycarbonate polymer structure as the polymer shown in Synthesis example 1 except for a polymerization ratio.

Synthesis Example 4

A polymer was synthesized by the same manner as Synthesis Example 1, except for changing amounts of BCFL to 3.904 kg, of Si-1 to 3.123 kg, and of Phosgene to 2.200 kg, and of PTBT to 147.4 g, and using 0.781 kg of Bisphenol A (Mitsui Chemicals, Inc.: BPA) (hereinafter referred to as "BPA"). Limit viscosity [η] of the obtained polymer was 0.26 dL/g, and as the result of infrared spectrum and others, this polymer was confirmed as a polycarbonate polymer having the following structure units.

X is

Examples 1 to 8 and Comparative Examples 1 to 3

The components shown in Table 2 were injected to a contact lens shaped mold (made of polypropylene, corresponding to a contact lens about 14 mm diameter, and 0.1 mm center thickness). And then, a UV ray was irradiated to this mold for 10 minutes to conduct photo polymerization to give contact lens shaped polymers. Thus obtained polymers were evaluated as follows. The results are shown in Table 2. (Visible Light Transmittance (% T))

A light transmittance of wave length between 380 to 780 nm of a plate 0.2 mm thick was measured in water by using a spectrophotometer UV2100 made by Shimadzu Co., Ltd.
(Moisture Content)

After hydrating and removing water on a surface by slightly wiping, a gel weight was measured (W1:g). The gel was put into a desiccator at 105° C. for 16 hours, and cooled down to a room temperature, and then the dried gel weight was measured (W2:g). The moisture content was calculated from a following formula:

$$(W1-W2)/W1 \times 100 (\%)$$

(Oxygen Permeability (Dk))

An oxygen permeability of a plate of 0.2 mm thick was measured by using a measuring device made by REHDER DEVELOPMENT Co., Ltd. by using a GAS-TO-GAS method. The measuring unit was $\times 10^{-11}$ (cm²/second)·(mLO₂/(mL·mmHg)).
(Double Refractive Index)

A double refractive index at 632.8 nm, and at an angle of 30 degrees was measured by using an auto ellipsometer made by Mizojiri Optical Co., Ltd.
(Shrinking Ratio of Volume)

A shrinking ratio of volume was calculated from a following formula:

A shrinking ratio (%) of volume of the solution by polymerization=100×(1−(monomer gravity/polymer gravity))

(Shape Holding Ability)

A shape holding ability of a lens, 14 mm diameter, 0.1 mm center thick lens confirmed by visual observation.

A shape holding ability of a lens, 14 mm diameter, 0.1 mm center thick lens confirmed by visual observation.

□: The lens was held its shape perfectly o: The lens was held its shape approximately □: The lens was deformed in its shape to flat to a certain degree x: The lens was deformed in its shape to flat and was difficult to apply The abbreviations in Table 2 mean the following compounds.

PCSi: Copolymers containing a polysiloxane structure and a polycarbonate structure NVP: N-Vinyl pyrrolidone HEMA: Hydroxy ethyl methacrylate DMAA: Dimethyl acrylamid MMA: Methyl methacrylate
TRIUM: Diethyleneglycol diallylether
AMA: Allyl methacrylate
EDMA: Ethyleneglycol dimethacrylate
D. 1173: dalocure 1173 (Ciba Specialty Chemicals K.K.)

TABLE 2

|  | Ex. | | | | | | | | Com. Ex. | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Composition | | | | | | | | | | | |
| PCSi | 30 | 30 | 30 | 30 | 20 | 20 | 20 | 20 | 30 | | |
| NVP | 60 | 70 | 70 | 70 | 80 | 80 | 80 | 80 | 70 | | 18 |
| HEMA | | | | | | | | | | 100 | |
| DMAA | 10 | | | | | | | | | | 42 |
| MMA | | | | | | | | | | | 40 |
| TRIAM | 0.9 | | 0.9 | 8.1 | 0.3 | 0.3 | 0.3 | 0.3 | | | |
| AMA | | 2.7 | | | | | | | | | |
| EDMA | | | | | | | | | 0.9 | 0.3 | 0.3 |
| D. 1173 | 0.5 | 0.5 | 0.5 | 0.5 | 0.5 | 0.5 | 0.5 | 0.5 | 0.5 | | |
| Physicality | | | | | | | | | | | |
| % T | >90 | >90 | >90 | >90 | >90 | >90 | >90 | 85 | 18 | >90 | >90 |
| Moisture Content (%) | 71 | 49 | 64 | 56 | 88 | 78 | 77 | 75 | — | 38 | 73 |
| Dk (ISO) | 112 | 81 | 105 | 90 | 124 | 107 | 96 | 82 | — | 11 | 34 |
| Refractive index | 1.38 | 1.43 | 1.39 | 1.41 | 1.35 | 1.37 | 1.37 | 1.37 | — | 1.43 | 1.37 |
| Shrinking Ratio of Volume (%) | — | — | — | — | 12 | — | — | — | — | 18 | 19 |
| Shape Holding Ability | ◉ | ◉ | ◉ | ◉ | ○ | ○ | ○ | ○ | — | ◉ | X |

Figure 1:
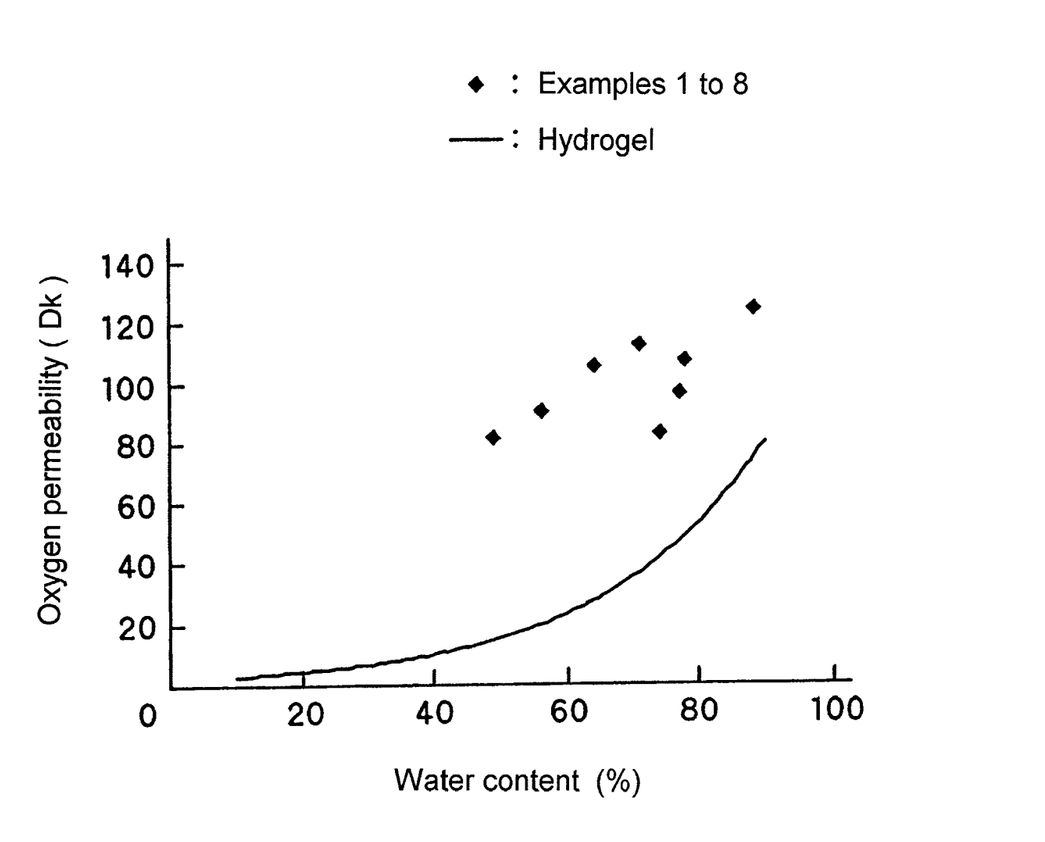
FIG. 1 shows a relationship between a water content and oxygen permeability of the transparent gel of the present invention.

As the results of Examples, a relation between the moisture content and the oxygen permeability of the hydrogel shown in Examples 1 to 8 was shown in FIG. 1.

As the result of FIG. 1, the hydrogels containing the PCSi of the invention show higher Dk value than theoretical Dk value derived from moisture there of, and it is shown that the hydrogels have high Dk value, whereby the hydrogels are confirmed as having an acceptable physicality for a material of a contact lens.

Thus it is shown that the obtained transparent gels of the invention have good Dk values, light transmittances, refractive index, and shape holding abilities. According to the results that the Shrinking Ratio of Volume of Example 7, Comparative Examples 1 and 2 were 12%, 18%, and 19%, it is also confirmed that the obtained transparent gels of the invention are more shrinkage resistant than the conventional polymers.

INDUSTRIAL APPLICABILITY

According to the present invention, a transparent gel containing an interpenetrating polymer network between a copolymer containing a polysiloxane structure and a polycarbonate structure and a hydrophilic polymer obtained by polymerizing a hydrophilic monomer, which has good gel strength, transparency, oxygen permeability, refractive index, and others, is obtained.

As the copolymers of the invention have no polymerizable group, it is possible to suppress shrinkage upon polymerization (mold polymerization) in a resin mold. This reduction of shrinkage leads to increased shape accuracy. And it is possible to attain the desired standard adjusting a ratio between soft segments (a silicon component) and hard segments, length of the soft segments, a structure of the hard segments, a molecular weight of the copolymer, and others. Further, adhesion of a surface of lens is controlled, whereby adsorption to a cornea can be avoided.

The invention claimed is:

1. A transparent gel comprising an interpenetrating polymer network of a copolymer and a hydrophilic polymer, the copolymer having a polysiloxane structure and a polycarbonate structure and the hydrophilic polymer being obtained by polymerizing a hydrophilic monomer and a cross linking agent;

wherein the above copolymer having a polysiloxane structure and a polycarbonate structure is derived from a compound shown by the general formula (A) and a compound shown by the general formula (B) and a compound forming a carbonic acid ester, general formula (A):

(wherein $R^1$ and $R^2$ are, respectively and independently, a member selected from the group consisting of a hydrogen atom, an alkyl group of C1-C10, an aryl group of C6-C12, an alkenyl group of C2 to C5, an alkoxy group of C1 to C5 and an aralkyl group of C7-C17, and when those groups have a carbon atom, those groups may contain a substituent selected from the group consisting of an alkyl group of C1 to C5, an alkenyl group of C2 to C5 and an alkoxy group of C1 to C5, Y is a group shown by the formula:

(wherein $R^3$ to $R^6$ are respectively a member selected from the group consisting of a hydrogen atom, an alkyl group of C1 to C10, an alkenyl group of C2 to C10, an alkoxy group of C1 to C10 and an aryl group of C6 to C12, or both $R^3$ and $R^4$ and both $R^5$ and $R^6$ are respectively combined together to form a carbon ring or a heterocyclic ring, and when those groups contain a carbon atom, those groups may have a substituent selected from the group consisting of an alkyl group of C1 to C5, an alkenyl group of C2 to C5 and an alkoxy group of C1 to C5, and a is an integer of 0 to 20), general formula (B):

(wherein $R^7$ to $R^{14}$ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5, $R^{15}$ is an aliphatic group of C1 to C6 or only shows a bond, X is a single polymer or a random copolymer of $—SiO(R^{16})(R^{17})—$ and/or $—SiO(R^{18})(R^{19})—$ and its polymerization degree is 0 to 200, and $R^{16}$ to $R^{19}$ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5); and wherein the above hydrophilic monomer is N-vinyl pyrrolidone, N,N-dimethylacrylamide and/or N-methyl-3-methylidene pyrrolidone; and wherein a ratio of said copolymer to said hydrophilic monomer is 5:95 to 40:60 by weight.

2. The transparent gel of claim 1, wherein the compound shown by the above formula (A) is a member selected from the group consisting of 9,9-bis(4-hydroxyphenyl)fluorene, 9,9-bis(4-hydroxy-3-methylphenyl)fluorene and 9,9-bis(4-hydroxy-2-methylphenyl)fluorene.

3. The transparent gel of claim 1, wherein a ratio of the polysiloxane structure to the polycarbonate structure contained in the above copolymer is 25:75 to 75:25 by weight.

4. A contact lens comprising the transparent gel of claim 1.

5. The contact lens of claim 4, wherein the compound shown by the above formula (A) is a member selected from the group consisting of 9,9-bis(4-hydroxyphenyl)fluorene, 9,9-bis(4-hydroxy-3-methylphenyl)fluorene and 9,9-bis(4-hydroxy-2-methylphenyl)fluorene.

6. The contact lens of claim 4, wherein a ratio of the polysiloxane structure to the polycarbonate structure contained in the above copolymer is 25:75 to 75:25 by weight.

7. A method for producing a transparent gel having an interpenetrating polymer network of a copolymer and a hydrophilic polymer, the method comprising dissolving as said copolymer, a copolymer containing a polysiloxane structure and a polycarbonate structure in a hydrophilic monomer solution; and polymerizing said hydrophilic monomer in the presence of a cross-linking agent to form said interpenetrating network with said copolymer;

wherein the above copolymer having a polysiloxane structure and a polycarbonate structure is derived from a compound shown by the general formula (A) and a compound shown by the general formula (B) and a compound forming a carbonic acid ester, general formula (A):

(wherein $R^1$ and $R^2$ are, respectively and independently, a member selected from the group consisting of a hydrogen atom, an alkyl group of C1-C10, an aryl group of C6-C12, an alkenyl group of C2 to C5, an alkoxy group of C1 to C5 and an aralkyl group of C7-C17, and when those groups have a carbon atom, those groups may contain a substituent selected from the group consisting of an alkyl group of C1 to C5, an alkenyl group of C2 to C5 and an alkoxy group of C1 to C5, Y is a group shown by the formula:

(wherein $R^3$ to $R^6$ are respectively a member selected from the group consisting of a hydrogen atom, an alkyl group of C1 to C10, an alkenyl group of C2 to C10, an alkoxy group of C1 to C10 and an aryl group of C6 to C12, or both $R^3$ and $R^4$ and both $R^5$ and $R^6$ are respectively combined together to form a carbon ring or a heterocyclic ring, and when those groups contain a carbon atom, those groups may have a substituent selected from the group consisting of an alkyl group of C1 to C5, an alkenyl group of C2 to C5 and an alkoxy group of C1 to C5, and a is an integer of 0 to 20),
general formula (B):

(B)

(wherein $R^7$ to $R^{14}$ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5, $R^{15}$ is an aliphatic group of C1 to C6 or only shows a bond, X is a single polymer or a random copolymer of —SiO($R^{16}$)($R^{17}$)— and/or —SiO($R^{18}$)($R^{19}$)— and its polymerization degree is 0 to 200, and $R^{16}$ to $R^{19}$ are respectively and independently a member selected from the group consisting of a hydrogen atom, an alkyl group of C1 to C5, an aryl group of C6 to C12, an alkenyl group of C2 to C5, an alkoxy group of C1 to C5 and an aralkyl group of C7 to C17, and when those groups contain a carbon atom, those groups may have a substituent selected from the group consisting of an alkyl group of C1 to C5, an alkenyl group of C2 to C5 and an alkoxy group of C1 to C5);

wherein the above hydrophilic monomer is N-vinyl pyrrolidone, N,N-dimethyl acrylamide and/or N-methyl-3-methylidene pyrrolidone; and wherein a ratio of said copolymer to said hydrophilic monomer is 5:95 to 40:60 by weight.

8. The method for producing a transparent gel of claim 7, wherein the above cross linking agent is allyl methacrylate or diethyleneglycol diallyl ether.

9. The method for producing a transparent gel of claim 8, wherein the polymerization is conducted in a mold.

10. The method for producing a transparent gel of claim 8, wherein the polymerization is conducted in a mold.

* * * * *